US008585900B2

(12) United States Patent
Alvarez-Cuenca et al.

(10) Patent No.: US 8,585,900 B2
(45) Date of Patent: Nov. 19, 2013

(54) COMPACT UPRIGHT BIOREACTOR FOR THE ELIMINATION OF NUTRIENTS

(76) Inventors: Manuel Alvarez-Cuenca, Toronto (CA); Maryam Reza, Toronto (CA)

( * ) Notice: Subject to any disclaimer, the term of this patent is extended or adjusted under 35 U.S.C. 154(b) by 599 days.

(21) Appl. No.: 12/852,068

(22) Filed: Aug. 6, 2010

(65) Prior Publication Data

US 2012/0031836 A1 Feb. 9, 2012

(51) Int. Cl.
*C02F 3/30* (2006.01)
(52) U.S. Cl.
USPC ........... 210/605; 210/615; 210/523; 210/260; 210/261; 210/903; 210/906
(58) Field of Classification Search
USPC ......... 210/603, 605, 615, 621, 622, 150, 188, 210/220, 221.1, 221.2, 260, 261, 903, 906, 210/623
See application file for complete search history.

(56) References Cited

U.S. PATENT DOCUMENTS

| | | | | |
|---|---|---|---|---|
| 6,984,323 B2* | 1/2006 | Khudenko | | 210/603 |
| 7,261,811 B2* | 8/2007 | Nakhla et al. | | 210/151 |
| 7,736,513 B2* | 6/2010 | Zhu et al. | | 210/605 |
| 2007/0193949 A1* | 8/2007 | You et al. | | 210/605 |
| 2008/0251439 A1* | 10/2008 | Pollock | | 210/194 |
| 2009/0218282 A1* | 9/2009 | Markle et al. | | 210/638 |
| 2010/0133158 A1* | 6/2010 | Zhu et al. | | 210/151 |

* cited by examiner

*Primary Examiner* — Fred Prince
(74) *Attorney, Agent, or Firm* — Gowling Lafleur Henderson LLP

(57) ABSTRACT

In accordance with particular process, method and system aspects there is provided a biological manner of treating water/wastewater. Treatment is undertaken in bioreactor configured to treat the water/wastewater through a first process of denitrification followed by a second process of biological phosphorus removal. The bioreactor may be defined by multiple stages arranged in compact vertical alignment, for example, to reduce a footprint of the bioreactor and to feed the water/wastewater between the stages using gravity. The stages may comprise, in order, a Deaeration stage, an Anoxic stage, an Anaerobic stage, and an Aerobic stage. Continuous vacuum operation in the Deaeration stage enhances the physical removal of oxygen and other dissolved gases.

34 Claims, 6 Drawing Sheets

COMPACT UPRIGHT BIOREACTOR FOR THE ELIMINATION OF NUTRIENTS

FIELD

The present application relates to the removal of nutrients, such as phosphorous and nitrates from water and/or wastewater.

BACKGROUND

In 2008, the Water Resources Institute in Washington D.C., identified excess nutrients in water as one of the leading causes of water degradation, and reported over 415 areas worldwide experiencing the devastating economic and environmental effects of eutrophication (algal bloom) and hypoxia (oxygen dissolved depletion). Recent surveys in United States and Europe found that a staggering 78 percent of the assessed continental U.S. coastal area and approximately 65 percent of Europe's Atlantic coast exhibit symptoms of eutrophication. Furthermore, trends in agricultural practices, energy use, and population growth indicate that coastal eutrophication will be an ever growing problem.

To combat hypoxia it is essential to reduce nutrients from land-based wastewater reaching rivers in runoff. This is effectively achieved by an adequate treatment of sewage and by reducing agricultural fertilizers reaching surface waters. It is estimated that 25% of all water body impairments are due to the effects associated with the excess of nutrients in water (oxygen depletion, algal growth, biological extinction). To palliate these effects municipalities have begun looking beyond conventional treatment technologies and have lowered effluent discharge limits for nitrogen and phosphorous compounds. These advanced technologies involve new bioreactors and/or biological processes.

About one-third of the influent phosphorous in wastewater treatment plants (WWTP) is removed by both the settling of the insoluble fraction, and by cellular growth which occurs in both primary and secondary treatments. Typical heterotrophic bacteria present in secondary treatment use phosphorous for cellular growth to make up 2.5% of their weight. The complete removal of nutrients occurs after the secondary treatment. That is, after the elimination of carbon and ammonia pollutants. These processes are followed by both denitrification to eliminate the nitrates, and by phosphorous removal. Currently, phosphorous removal is primarily done by the addition of coagulants and flocculants. Because these chemicals create much sludge and are expensive, biological phosphorous removal is becoming the preferred option. In view of the foregoing, it would be desirable to develop a more efficient and cost effective method for nutrient removal.

SUMMARY

In accordance with particular process, method and system aspects there is provided a biological manner of treating water/wastewater. Treatment is undertaken in bioreactor configured to treat the water/wastewater through a first process of denitrification followed by a second process of biological phosphorus removal. The bioreactor may be defined by multiple stages arranged in compact vertical alignment, for example, to reduce a footprint of the bioreactor and to feed the water/wastewater between the stages using gravity. The stages may comprise, in order, a Deaeration stage, an Anoxic stage, an Anaerobic stage, and an Aerobic stage. Continuous vacuum operation in the Deaeration stage enhances the physical removal of oxygen and other dissolved gases, which can interfere with nutrient removal in later stages.

Thus, in one aspect there is provided a method of removing nutrient from water/wastewater. The method comprises denitrifying the water/wastewater through a first process; and, subsequently, biologically removing phosphorus through a second process. The first process and second process are undertaken in a bioreactor comprising multiple stages in compact vertical alignment whereby water/wastewater is fed into the top of the Deaeration stage and flows downward sequentially from one stage to the other.

The method may comprise removing dissolved oxygen and other gases in the water/wastewater in a Deaeration stage; applying denitrifying organisms in an Anoxic stage to reduce nitrates in the water/wastewater to free nitrogen; applying phosphorous accumulating organisms (PAOs) in an Anaerobic stage to uptake acetates and convert them to polyhydroxyalkanoates (PHAs) and release orthophosphate into water/wastewater and applying oxygen in an Aerobic stage to the PAOs to remove the orthophosphates. The multiple stages are defined by the Deaeration stage, Anoxic stage, Anaerobic stage and Aerobic stage.

Removing dissolved oxygen and other gases may comprise applying a continuous vacuum in the Deaeration stage to enhance the physical removal of oxygen and other dissolved gases that interfere with the removal of nutrients from the water/wastewater in subsequent of the multiple stages. The method may comprise removing dissolved oxygen and other gases by a physical deaeration process to control the anoxic and anaerobic conditions in the Anoxic and Anaerobic stages without addition or recycle of a sludge.

The Anoxic stage may operate in an anoxic condition to reduce a nitrate level of the water/wastewater to no more than about 0.5 mg/L. The nitrate level of the water/wastewater is reduced in the Anoxic stage so as to avoid interfering with a biological phosphorus removal process of the Anaerobic stage and Aerobic stage. The method may comprise adding a carbon source to said water/wastewater in said Anoxic stage to facilitate nitrate removal by the denitrifying organisms.

Denitrifying organisms within the Anoxic stage may be contained in the stage using a high interfacial area packing.

The method may comprise feeding water/wastewater to the top of the Deaeration stage. From the Deaeration stage water/wastewater is pumped to the Anoxic stage from which water/wastewater flows down to the Anaerobic stage and next to the Aerobic stage by gravity thereby to reduce pumping requirements compared to conventional horizontal biological nutrient removal plants.

The multiple stages may be defined by a modular bioreactor using a cylindrical cross section for each of the stages to enhance control and mixing of flows relative to a rectangular cross section. The method may comprise at least one of expanding, substituting and modifying at least one of the multiple stages by adding a modular cylindrical section.

In another aspect there is provided a bioreactor for treating water/wastewater to remove nutrients. The bioreactor comprises multiple stages configured to treat the water/wastewater through a first denitrification process followed by a second biological phosphorus removal process without interference between the first and second processes. The multiple stages are further configured to be in vertical alignment whereby water/wastewater is fed at the top of the Deaeration stage and water/wastewater exits from the bottom stage of the bioreactor called Aerobic stage.

The multiple stages comprise a Deaeration stage in which dissolved oxygen and other gases in the water/wastewater are removed; an Anoxic stage in which nitrates in the water/ wastewater are reduced to free nitrogen by denitrifying organisms and the free nitrogen is removed (for example, escapes through a vent in the Anoxic stage); an Anaerobic stage in which phosphorous accumulating organisms (PAOs) uptake acetates and convert them to polyhydroxyalkanoates (PHAs) and release orthophosphate into water/wastewater; and an Aerobic stage in which the PAOs remove the orthophosphates from the water/wastewater.

The bioreactor may be configured utilizing a compact vertical configuration of the multiple stages to reduce a footprint of the bioreactor compared to conventional horizontal biological nutrient removal plants.

In another aspect, there is provided A water/wastewater treatment process comprising: providing water/wastewater to a bioreactor to produce a treated effluent, the bioreactor comprising multiple stages configured to treat the water/wastewater through a first denitrification process followed by a second biological phosphorus removal process, the multiple stages further configured to be in vertical alignment whereby water/wastewater is fed into the top of the Deaeration stage and flows downward sequentially from one stage to the other. The bioreactor may be configured utilizing a compact vertical configuration of the multiple stages to reduce a footprint of the bioreactor compared to conventional horizontal biological nutrient removal plants. Treatment of the water/wastewater through the first and second processes may be performed without interference between the first and second processes thereby to increase removal efficiency relative to conventional simultaneous removal processes.

The process may comprise feeding the water/wastewater into the top of the Deaeration stage and flows downward sequentially from one stage to the other. thereby to reduce pumping requirements compared to conventional horizontal biological nutrient removal plants. The multiple stages may comprise, in order: a Deaeration stage in which dissolved oxygen and other gases in the water/wastewater are removed; an Anoxic stage in which nitrates in the water/wastewater are reduced to free nitrogen by denitrifying organisms and the free nitrogen is removed (for example, escapes through a vent in the Anoxic stage); an Anaerobic stage in which phosphorous accumulating organisms (PAO) uptake acetates and convert them to polyhydroxyalkanoates (PHAs) and release orthophosphate into water/wastewater.

These and other aspects will become apparent in the detailed description that follows by reference to the following figures.

DETAILED DESCRIPTION

Figure 1:
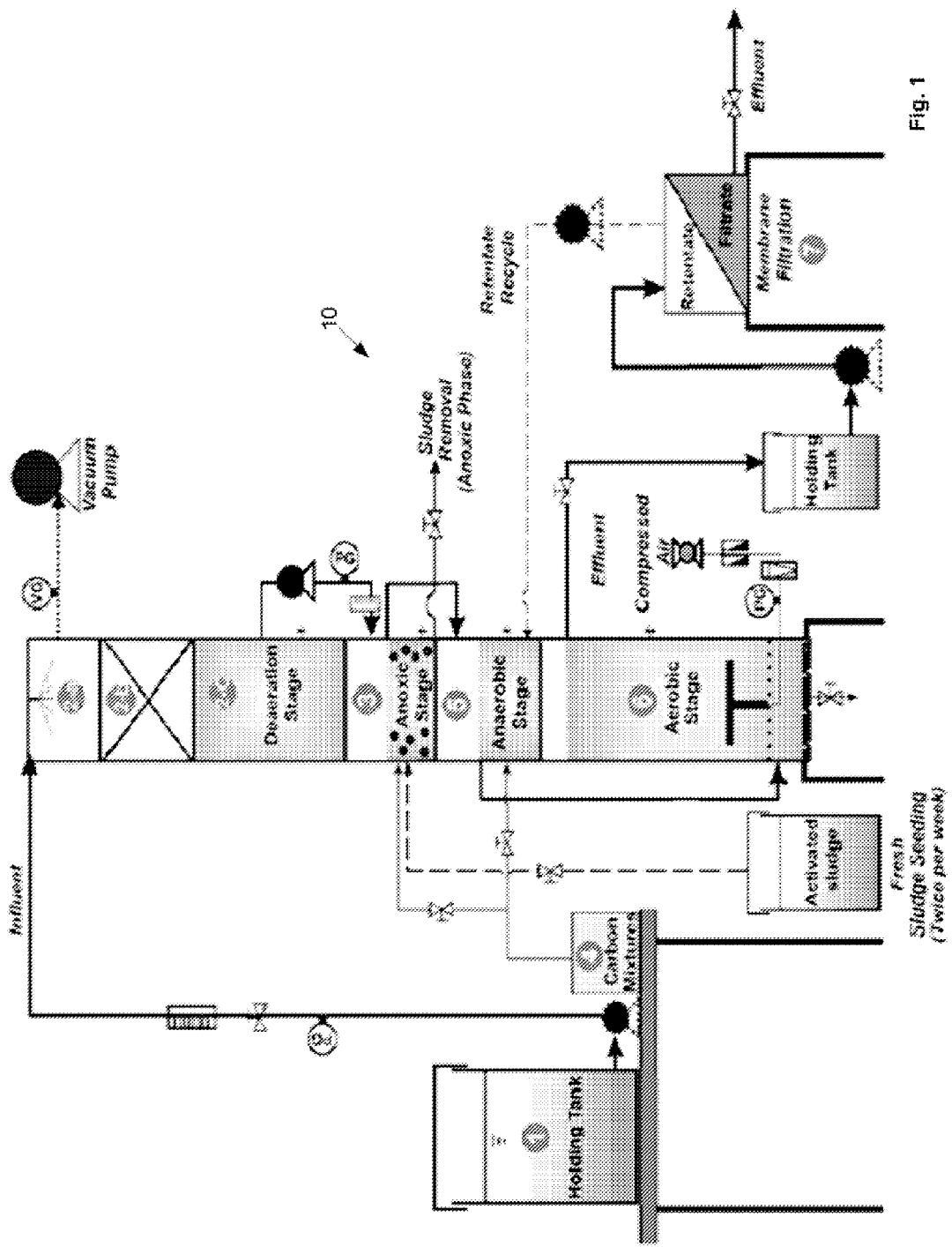
FIG. 1 is a schematic drawing of the bioreactor and the method in accordance with an embodiment.

A method of removing nutrient from water/wastewater is provided. With reference to FIG. 1, the method comprises treating the water in the four treatment stages, where the four stages are arranged in a vertical alignment with respect to each other. The four stages comprise: a Deaeration stage 2 in which dissolved gases, such as oxygen and nitrogen, in the water are removed; an Anoxic stage 3 in which denitrifying bacteria reduce nitrates to free nitrogen, and the free nitrogen escapes from the water; an Anaerobic stage 5 in which phosphorous accumulating organisms (PAOs) uptake acetates and convert them polyhydroxyalkanoates (PHAs); and an Aerobic stage 6 in which the PAOs uptake phosphates in the water and convert them to polyphosphates and store them internally.

As used herein, the term "wastewater" refers to wastewater comprising a high concentration of both phosphorus and nitrates, for example, a concentration of phosphorus which is at least about 5 mg/L and generally higher, e.g. at least about 8 mg/L, and a nitrate concentration that is at least about 20 mg/L and generally higher, e.g. at least about 25 mg/L, which has a total suspended solid content of about 10 mg/L. An example of wastewater in accordance with an embodiment for treatment, thus, includes wastewater that has undergone primary and secondary wastewater treatments.

To treat water/wastewater (1) in accordance with an embodiment, a first step of the treatment is the deaeration or vacuum stage. In this stage of the treatment, dissolved oxygen and nitrogen are physically removed from the wastewater by deaeration. Deaeration may be accomplished by the application of a vacuum, for example, using any standard source of vacuum. Vacuum deaeration is applied continuously at a pressure below atmospheric to achieve a level of about 0.01-0.1 mg/L dissolved oxygen. In one embodiment, vacuum at an absolute pressure in the range of about 50-63 cm of Hg at a temperature in the range of about 20-25° C. is applied. To enhance removal of dissolved oxygen, liquid distributers such as a misting nozzle (2-a), and packing (2-b), e.g. polypropylene packing such as Tri-Packs®, may also be used in the deaeration stage to improve liquid distribution and to increase surface area for removal of dissolved oxygen as described by Alvarez-Cuenca, M. Ph.D. Thesis (1979). (The University of Western Ontario, Canada, the contents of which are incorporated herein by reference). The deaerated water/wastewater is collected in the reservoir section of the Deaeration stage (2-c) (referring to FIG. 1).

The effluent from the Deaeration or vacuum stage enters the Anoxic stage. In the Anoxic stage, the operating conditions favor the breakdown of nitrates (i.e. denitrification) by denitrifying organisms such as *Pseudomonas, Aerobacter, Achromobacter* and *Micrococcu*. Such denitrifying organisms are inherent in the wastewater. In order to support the growth of the denitrifying organisms, a source of carbon (4) is required. Suitable sources of carbon for this purpose include biodegradable organic matter such as methanol or volatile fatty acids (VFA) (e.g. electron donors). The amount of carbon source required is an amount suitable to support organism growth so as to achieve denitrification to a desired level, e.g. to achieve denitrification to a nitrate level of no more than about 0.5 mg/L. Although the wastewater may itself include carbon suitable for use by the denitrifying organisms, generally an external source of carbon is required on an ongoing basis during the treatment to result in an adequate level of carbon in the Anoxic stage, e.g. a total amount of carbon of about 250-300 mg/L. This Anoxic stage is conducted under anoxic conditions at a temperature suitable to encourage denitrification, e.g. preferably less than about 40° C., more preferably in the range of about 15-30° C., e.g. in the range of about 20-25° C. The pH may range from about 6.5-9.0, and preferably in the range of about 7.0 to 8.5. Denitrification in the Anoxic stage occurs until a low level of nitrate is achieved, e.g. preferably, until a level of denitrification of at least about 95%, e.g. in the range of about 95-100% denitrification to result in a nitrate level on the wastewater of, for example, no more than about 0.5 mg/L. An enhanced rate of denitrification may be achieved in the Anoxic stage compared to conventional denitrification units because of the very low oxygen dissolved in the effluent of the previous stage (Deaeration stage). By the effective removal of oxygen, the chemical equilibrium in the denitrification reaction is displaced towards the breakdown of nitrates. The low oxygen concentration in the anoxic stage is intended to lower the consumption of carbon source used, thus making the process more economic than in conventional denitrification processes.

To facilitate the denitrification process in the Anoxic stage, packing is used to maintain the large inventory of denitrifiers in this stage and achieve high nitrate removal. At the same time, the bio film formation of denitrifiers on the surface of the packing reduces their flow to the Anaerobic stage thus avoiding the interference of the denitrifiers in the phosphorus removal process. Any suitable packing may be used, including for example, a packing comprising Hydroxyl-Pac media.

The denitrified effluent from the Anoxic stage flows to the Anaerobic stage in which anaerobic conditions is maintained. During this stage, the conditions favor the growth of phosphorus-accumulating organisms such as *Acinetobacter, Candidatus Accumulibacter phosphatis* and *Pseudomonas putida* GM6, which are also inherent in the wastewater. These organisms uptake and convert the remaining carbon source (e.g. volatile fatty acids) into poly-b-hydroxyalkanoates with the energy provided from the breakdown of intracellular polyphosphates. As a result of this breakdown, the phosphorus-accumulating organisms release ortho-phosphate into the wastewater. In order to facilitate the activity of phosphorus-accumulating organisms, sludge separated by the ceramic membrane may be recycled back to the Anaerobic stage. This reduces the need for fresh sludge addition and increases efficiency.

In the final stage, in accordance with an embodiment of the present method, the Aerobic stage, the conditions favour phosphorus utilization by phosphorus-accumulating organisms. The effluent from the Anaerobic stage is exposed to aerobic conditions, e.g. dissolved oxygen in the range of about 2.5-3.5 mg/L. Oxygen may be added to the liquid using known methods, for example, bubbled into the liquid using an air diffuser. Preferably the pH during this stage is in the range of about 7-8 and the temperature is in the range of about 18-25° C. During the Aerobic stage, the phosphorus-accumulating organisms oxidize poly-b-hydroxyalkanoates, and using the energy released from this oxidation to uptake ortho-phosphates from the water/wastewater and to convert them into poly-phosphates which can be used by the organisms to reconstruct their cell structure, as well as for growth and reproduction. Thus, oxidation results in the uptake of the phosphorus in the wastewater by the organisms. The aerobic stage of the method is conducted until a suitable reduction of phosphorus level is achieved, for example, a level of no more than about 0.5 mg/L of phosphorus, and preferably a level of less than about 0.1 mg/L of phosphorus.

The treated water may be filtered (7) to collect and recycle PAOs back into the Anaerobic stage using well-established technology like membranes. Persons of ordinary skill in the art will appreciate that some elements of the bioreactor of FIG. 1 such as various holding tanks, air or liquid streams, liquid flow meters, air flow meters, pressure gauges, vacuum gauges, pumps (e.g. gear pump, vacuum pump, and metering pump) pressure air filters, globe, air or sampling valves and air diffuser are shown but not described. Further description is provided with reference to FIG. 6.

Figure 6:
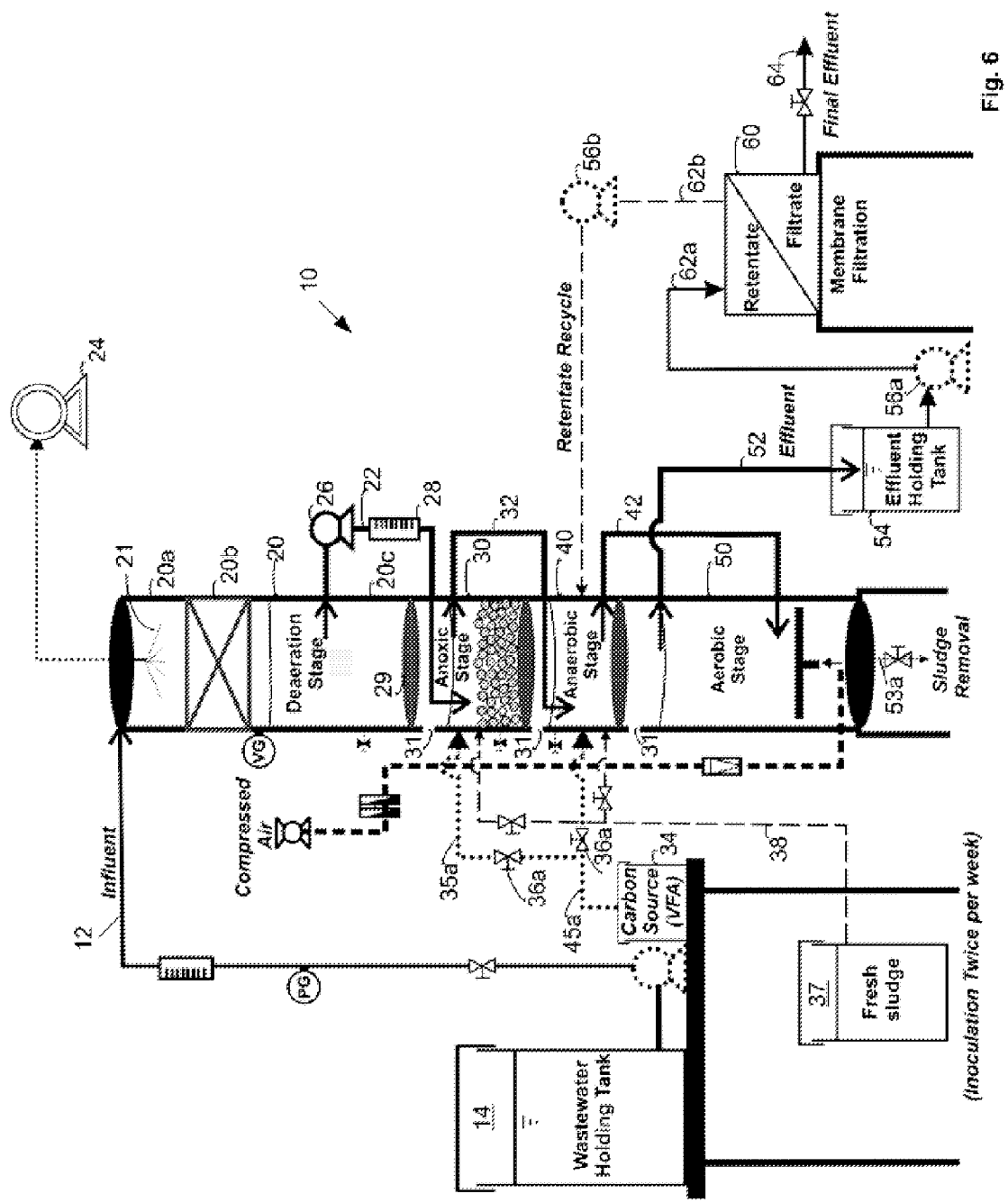
FIG. 6 illustrates a Compact Upright Bioreactor for the Elimination of Nutrients, showing its configuration and geometry in accordance with an embodiment.

In another aspect, a bioreactor is provided that is sufficient to treat wastewater in accordance with a method as detailed above. Referring to FIG. 6, a bioreactor 10 according to one embodiment is provided. The bioreactor 10 comprises a cylindrical column suitable to conduct each stage of the treatment method in vertical alignment including, from top to bottom, a Deaeration stage 20, an Anoxic stage 30, an Anaerobic stage 40 and an Aerobic stage 50. The cylindrical stages may be made of materials that are suitable for the biological treatment of wastewater, such as fiberglass, steel or concrete. The use of cylindrical stages provide better mixing and also permits more readily stage replacement, e.g. for upsizing and capacity expansion. The capacity of each stage will vary depending on the process that occurs here within. Adjacent stages are separated by flat flanges (e.g. 29) and connected by outer pipes including an influent pipe 12 connecting the influent holding tank 14 to the Deaeration stage, pipe 22 connecting Deaeration stage to Anoxic stage, pipe 32 connecting Anoxic stage to Anaerobic stage, pipe 42 connecting Anaerobic stage to Aerobic stage and effluent pipe 52 connecting the Aerobic stage to an effluent holding tank 54.

The Deaeration stage 20 comprises three sections, an upper section 20a, a mid-section 20b and a lower section 20c, each of which are vertically aligned and in communication. The top portion 20a of Deaeration stage 20 is connected to a vacuum pump 24 suitable to generate a vacuum appropriate to remove dissolved oxygen from water, e.g. vacuum in the range of about 50-63 cm of Hg. The water is delivered to the Deaeration stage by a liquid distributor 21 such as a misting nozzle. Mid-section 20b comprises a packing suitable to provide liquid distribution as well as more surface area for DO removal, e.g. plastic hollow spherical packing called Tri-Packs®. The lower section 20c receives water from the mid-section 20b. Water is pumped from the Deaeration stage 20 to the Anoxic stage 30 using a gear pump 26 which is connected to the pipe 22 as well as a liquid flow meter 28.

The Anoxic stage 30 also comprises high interfacial area packing as described suitable to maintain the denitrifying microorganisms within the stage. A tank 34 holding carbon sources is connected via pipes 35a and 45a to each of the Anoxic and Anaerobic stages 30, 40. In addition, a sludge-containing tank 37 is connected via pipe 38 to the Anoxic stage 30 and Anaerobic stage 40. Tank 37 is present for the purposes of the inoculation of the lab scale treatment of synthetic wastewater which is lacking in denitrifying bacteria and phosphorus-accumulating organisms. The sludge tank provides sludge to the Anoxic and Anaerobic stages to seed the bioreactor with the required microorganisms. Such seeding is not required in the industrial scale treatment of secondary effluent wastewater which already comprises these organisms.

The Aerobic stage 50 includes a globe valve 53a to permit removal of sludge from the tank, when necessary.

Each of the Anoxic, Anaerobic and Aerobic stages includes vents 31 to vent gases formed therein and prevent pressure build-up.

The effluent holding tank 54 is connected to a microfiltration membrane unit 60 via metering pump 56a and pipe 62a. The final filtered effluent 64 from the membrane unit 60 may enter into a disinfection unit (not shown) via piping 64 for further treatment while retentate comprising PAOs, is fed back to the Anaerobic stage 40 using metering pump 56b through pipe 62b.

In use, water/wastewater (influent) to be treated is fed into the bioreactor 10. The water/wastewater, which may initially be held in a holding tank, is fed into the Deaeration stage in which dissolved oxygen and other gases are physically removed by vacuum. A water distributor may be used to create small water droplets to ease the removal of dissolved oxygen by vacuum. Flow of the water over packing also increases water distribution and thereby increases deaeration efficiency. The flowrate of the water is adjusted to permit sufficient deaeration of the water/wastewater, e.g. to a level of less than about 0.2-0.5 mg/L dissolved oxygen. A reservoir 20c is designed to hold the liquid to about 6 hours, and often less than 6 hours. The deaerated water then flows into the Anoxic stage 30 in which denitrifying microorganisms are established and function to breakdown or remove nitrates from the water. A suitable carbon source 34 is fed into the Anoxic stage from a carbon mixture tank to support the growth of the denitrifying microorganisms. Residence time in the Anoxic stage to achieve a desirable level of denitrification, e.g. a level of no more than about 0.5 mg/L nitrates, is generally in the range of about 2-4 hours. The denitrified water then flows into the Anaerobic stage 40 where the anaerobic condition and addition of carbon source 34 favor the activity of phosphorus-accumulating organisms (PAOs). Residence time in the Anaerobic and Aerobic stages is sufficient to reduce phosphorus to a level of no more than about 0.1 mg/L. To achieve this reduction in phosphorus level in the wastewater, residence time in the Anaerobic stage is generally about 0.5-2 hours, while residence time in the Aerobic stage 50 is generally about 4-12 hours. The treated water (effluent 52) may then be fed through a membrane filtration system (generally 60) to separate the PAOs from water and yield the final effluent 64 with phosphorus concentration of 0.1 mg/L or less.

The use of a vacuum stage allows the fast physical removal of oxygen and other unwanted gases that can interfere with the biological removal of the nutrients in the next stages. For example, the effective removal of oxygen shifts the chemical equilibrium in the denitrification reaction towards the breakdown of nitrates in the Anoxic stage. This prevents potential interference of nitrates with the biological elimination of phosphorus in the Anaerobic and Aerobic stages thereby resulting in higher removal efficiency of both relative to conventional biological nutrient removal technologies.

In addition, the upright modular design of the bioreactor provides flexibility with respect to installation, substitution and/or expansion, and due to its vertical arrangement, provides a smaller footprint. In addition, gravity flow of the liquid due to the vertical orientation of the bioreactor results in fewer pumps and power consumption costs relative to the horizontal flow between stages in currently existing biological nutrient removal reactors The use of a method and bioreactor as set out above is exemplified in the following example which is not to be construed as limiting.

EXAMPLE

A synthetic wastewater solution comprising the components shown in Table 1 below was prepared.

TABLE 1

| Chemical Compounds | Concentration (volume or grams) | COD | Nitrate | P |
|---|---|---|---|---|
| $CH_3COOH$ | 5-10 ml | Variable | — | — |
| Butyric Acid | 5-10 ml | Variable | — | — |
| Propanoic Acid | 5-10 ml | Variable | — | — |
| Methanol | 10 ml | Variable | — | — |
| NaOH (Salt) | 15 grams in 2 L | | | |
| $KNO_3$ | 4.109 g | — | 25 mg/L | — |
| $KH_2PO_4$ | 5.535 g | — | — | 10 mg/L (P) |
| $Na_2HPO_4 \cdot H_2O$ | 5.614 g | — | — | 10 mg/L (P) |
| $Na_2HPO_4$ | 5.776 g | — | — | 10 mg/L (P) |
| Minerals | | | | |
| $NaHCO_3$ | 34.7 g | — | — | — |
| KCl | 4.5 g | — | — | — |
| $CaCl_2 \cdot H_2O$ | 1.512 g | — | — | — |
| $MgSO_4 \cdot 7H_2O$ | 1.512 | — | — | — |
| $FeCl_3$ | 1.5 g/L | — | — | — |
| $Na_2SO_4$ | 0.1 g/L | — | — | — |
| $ZnCl_2$ (Zinc chloride) | 0.12 g/L | — | — | — |

The solution was fed into the Deaeration stage of the bioreactor from the top as shown in FIG. 6. Vacuum was applied to this stage at an absolute pressure of between about 50-63 cm of Hg. The temperature was maintained between about 20-25° C. The dissolved oxygen concentration was measured to be 0 mg/L by a sensor.

Figure 2:
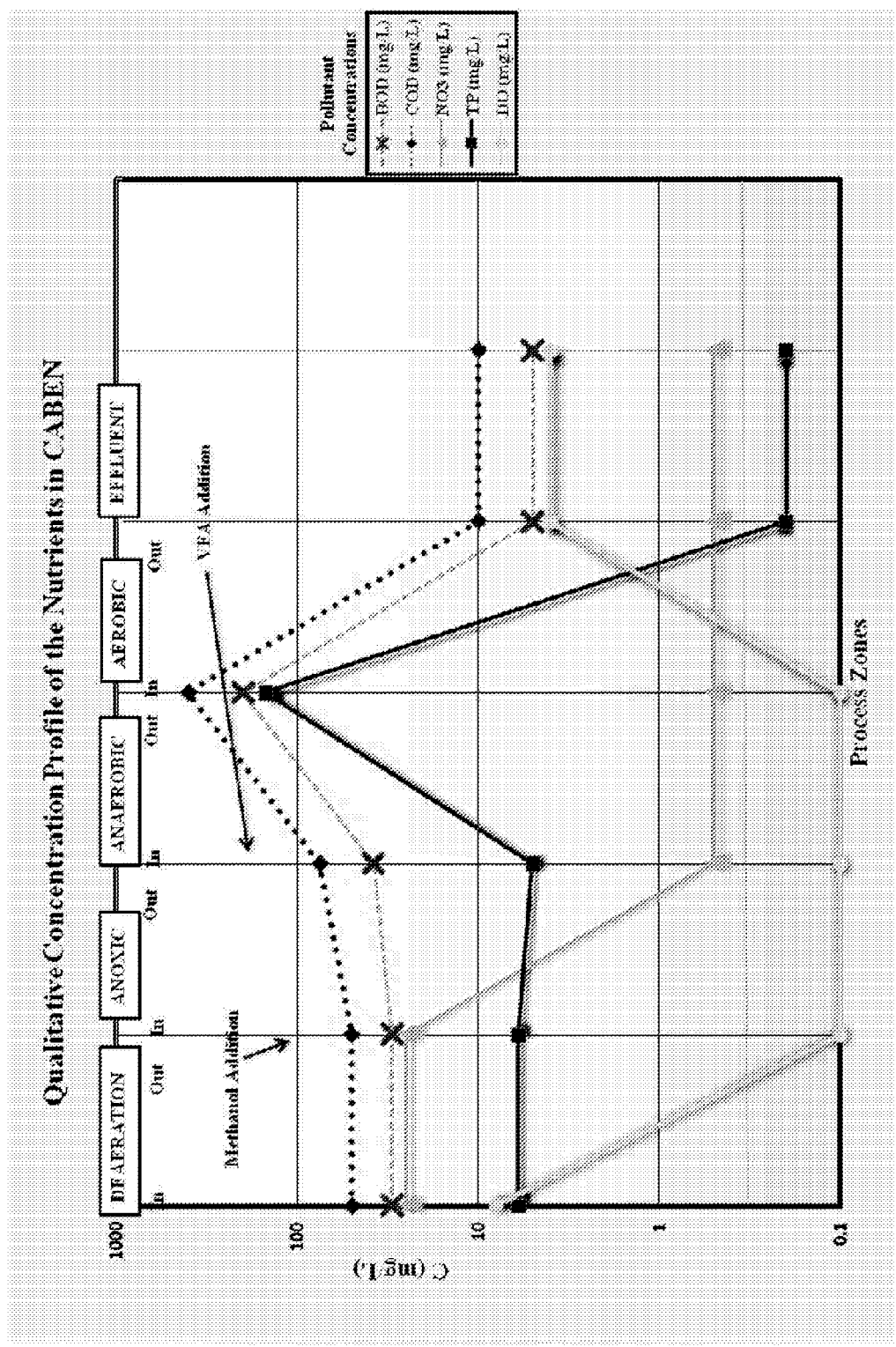
FIG. 2 graphically illustrates the semi-qualitative concentration profiles of the $BOD_5$, COD, dissolved oxygen (DO), $NO_3^-$, and total phosphorous (TP) in water using the method of FIG. 1.

The performance of the bioreactor was monitored by comparing influent specifications to target effluent specifications. Predicted effluent specifications throughout the course of the treatment, determined based on optimal conditions, are graphically illustrated in FIG. 2 for comparison with actual specifications.

TABLE 2

| Parameters | Design Influent Specifications | Design Effluent Specifications |
|---|---|---|
| Flowrate (L/day) | 120 | 120 |
| $BOD_5$ (mg/L) | 50 | <5 |
| COD (mg/L) | 80 | <10 |
| TSS (mg/L) | 0-8 | <5 |
| $NO_3$ (mg/L) | 25 | <0.5 |
| P (mg/L) | 8 | <0.1 |
| DO (mg/L) | 4-6 | 2.5-3.5 |

Figure 3:
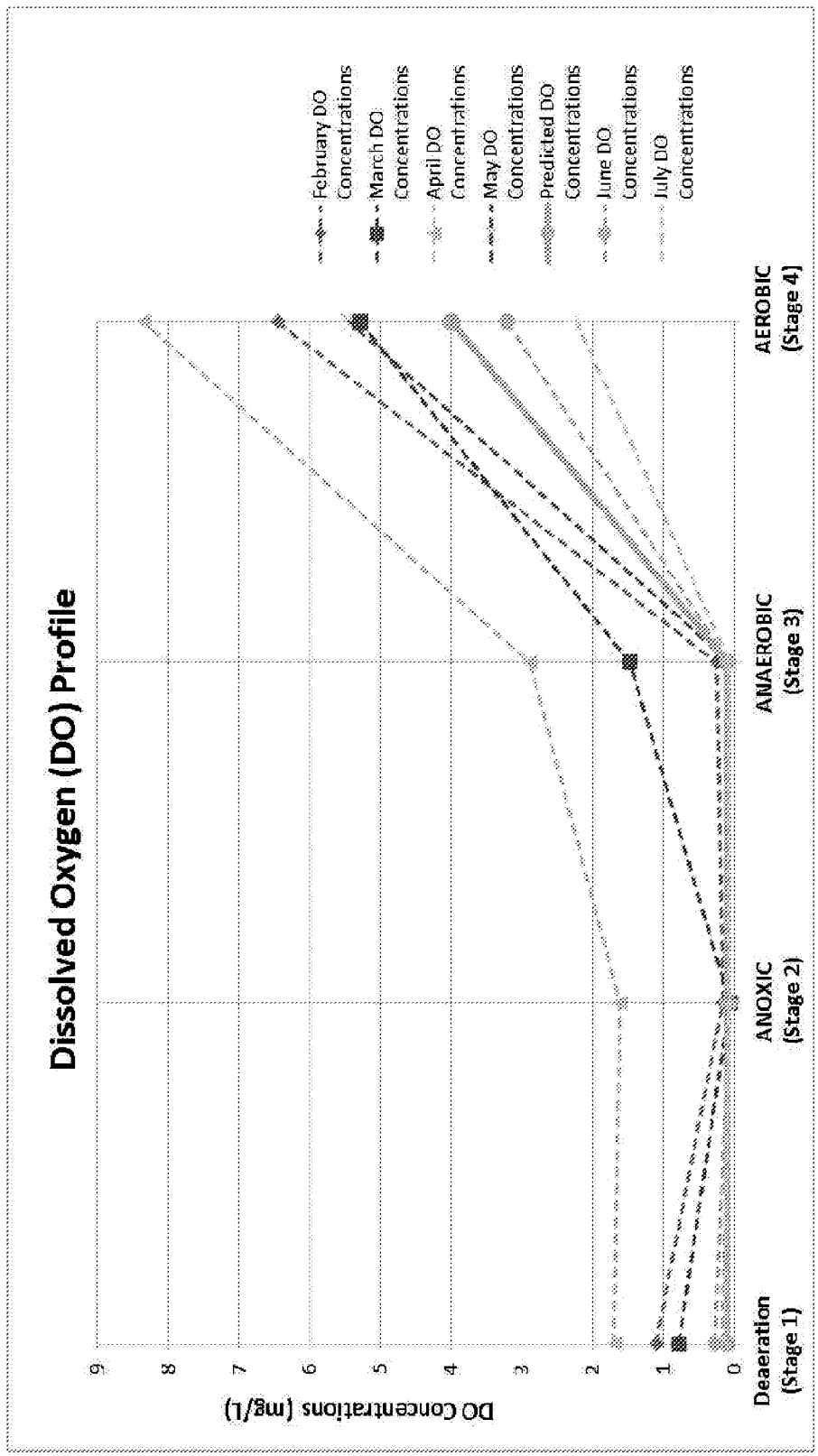
FIG. 3 graphically illustrates the removal profile of dissolved oxygen using the method of FIG. 1.

The dissolved oxygen (DO) concentration at each stage of the treatment for a six month period are set out in Table 3 below and graphically illustrated in FIG. 3. As can be seen, the DO values at each stage approach the target or objective value over time.

TABLE 3

| Dates → Process Stages | 18-Feb-10 | 10-Mar-10 | 27-Apr-10 | 20-May-10 | 9-June-10 | 9-July-10 | Objective |
|---|---|---|---|---|---|---|---|
| Deaeration | 1.1051 | 0.7787 | 1.6982 | 0.1662 | 0.2792 | 0.1457 | 0.1 |
| Anoxic | 0.1660 | 0.0605 | 1.6195 | 0.0615 | 0.0623 | 0.060 | 0.1 |
| Anaerobic | 0.2518 | 1.4824 | 2.8834 | 0.073 | 0.0744 | 0.0716 | 0.1 |
| Aerobic | 6.4493 | 5.2846 | 8.3465 | 5.445 | 3.2094 | 2.23 | 2.5-3.5 |

Figure 4:
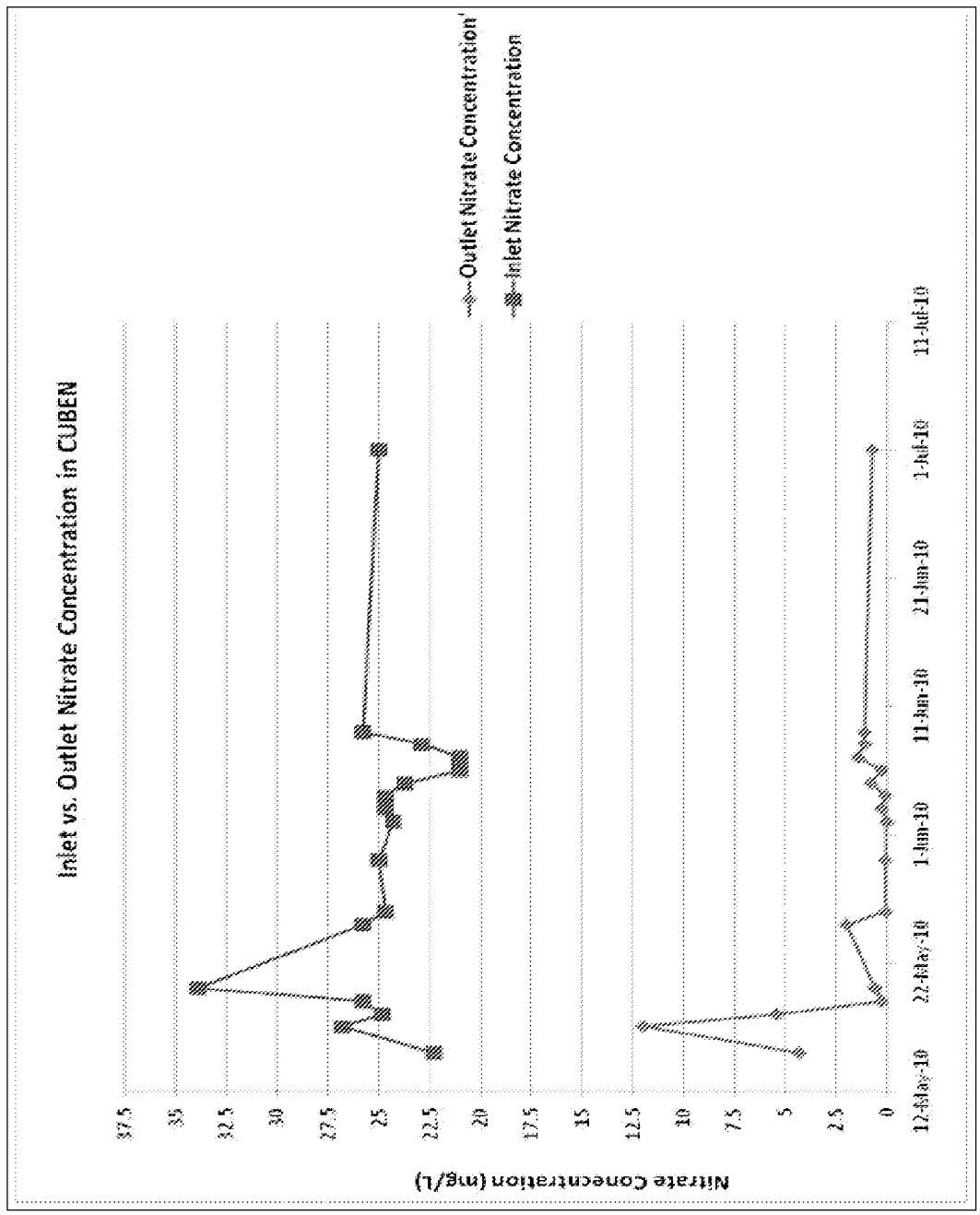
FIG. 4 graphically illustrates the inlet and outlet nitrate concentrations to highlight nitrate removal efficiency of the bioreactor using the method of FIG. 1.

The inlet and outlet nitrate concentration at each stage in the bioreactor over a period of time is shown in FIG. 4. FIG. 4 also compares the nitrate removal performance with the target nitrate profile. The experimental nitrate removal results correspond closely with the target profile. The inlet nitrate concentration was variable ranging from 21 mg/L to 34 mg/L and the outlet nitrate concentrations reached 0.1 mg/L as the commissioning of the bioreactor progressed and steady state was achieved. This graph shows superior and consistent nitrate removal performance of the bioreactor.

Figure 5:
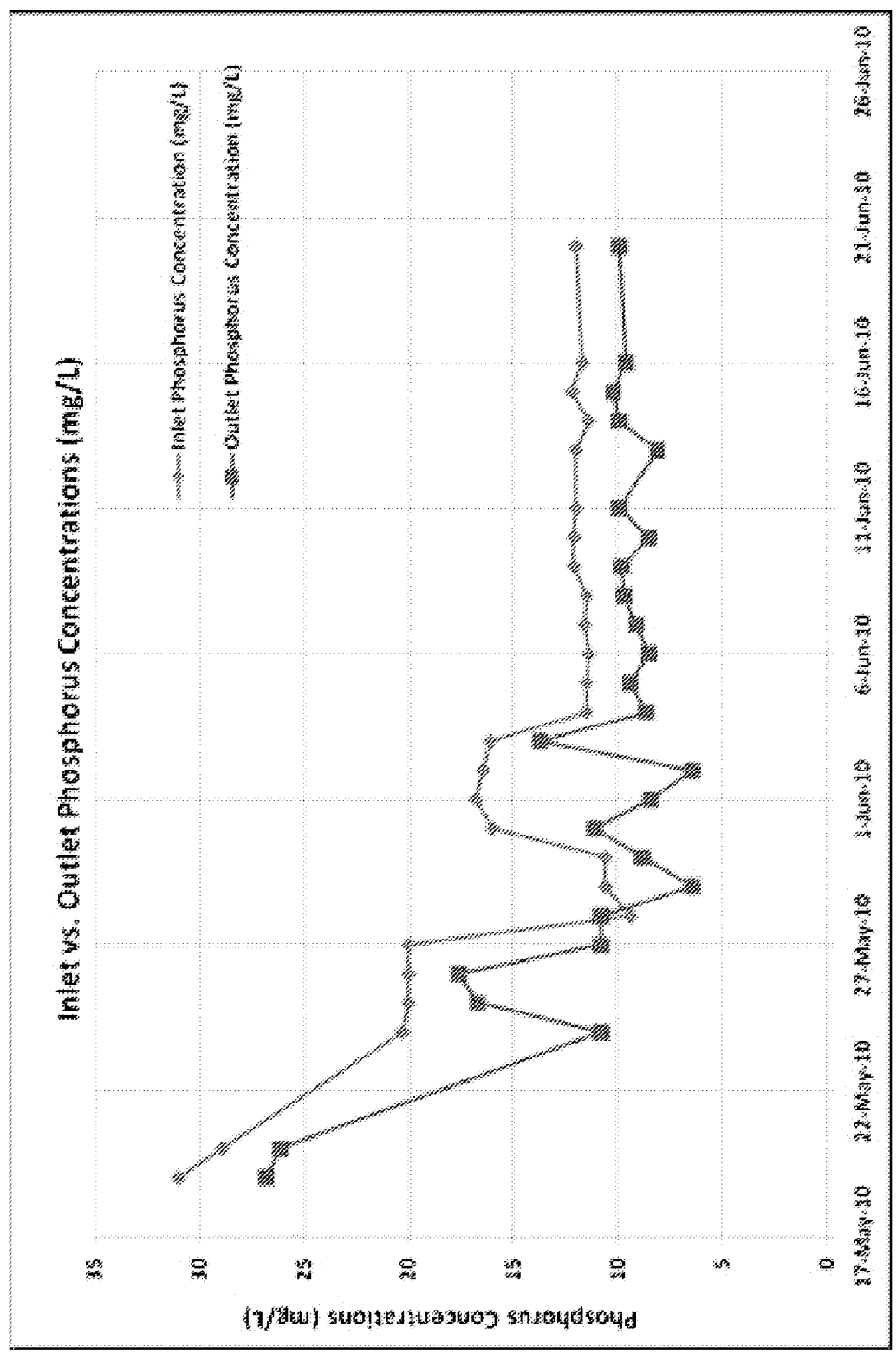
FIG. 5 graphically illustrates the inlet and outlet phosphorus concentration using the method of FIG. 1.

Phosphorus removal efficiency of the bioreactor over a period of time was also monitored as shown in FIG. 5. Inlet phosphorus concentration was varied from 10 mg/L up to 30 mg/L. The reason for varying the inlet phosphorus concentration was to analyze its effect on the phosphorus removal efficiency as increased phosphorus concentration in the influent is believed to enrich the PAO population in the bioreactor and consequently enhance the process. Initially, during the commissioning period, there was a considerable difference between the inlet and outlet phosphorus concentrations. During the first month of the unit operation, the overall phosphorus removal efficiency of the bioreactor reached as high as 60%. However, the phosphorus removal efficiency was reduced to approximately 12% during the commissioning period. These results are consistent with those observed in BNR plants during the commissioning period. Once continuous operating conditions are well established and a sufficient PAO population is attained phosphorus removal efficiency will increase to approach the target phosphorus concentration in the effluent of <0.1 mg/L. Due to the slow growth rate of PAOs and their hypersensitivity to the operating parameters of the bioreactor, high phosphorus removal efficiency will be attained 6 months after a large population of PAOs is established.

Microscopic analysis and well known technique called Fluorescent in Situ Hybridization (FISH) clearly identified the presence of PAOs, more specifically *Candidatus Accumulibacter Phosphatis* in both Anaerobic and Aerobic stages. These techniques must be used regularly to monitor and optimize the biological phosphorus removal process.

We claim:

1. A method of removing nutrient from water/wastewater comprising:
   denitrifying the water/wastewater through a first process; and, subsequently, biologically removing phosphorus through a second process;
   wherein the first process and second process are undertaken in a bioreactor comprising four stages in compact vertical alignment whereby water/wastewater is fed into the top of a Deaeration stage and flows sequentially through the four stages, from one stage to the other, only downwardly via gravity.

2. The method of claim 1 comprising:
   removing dissolved oxygen and other gases in the water/wastewater in the Deaeration stage;
   applying denitrifying organisms in an Anoxic stage, to reduce nitrates in the water/wastewater to free nitrogen;
   applying phosphorous accumulating organisms (PAOs) in an Anaerobic stage to uptake acetates and convert, them to polyhydroxyalkanoates (PHAs) and release orthophosphate into water/wastewater; and
   applying oxygen in an Aerobic stage to remove the orthophosphates by PAOs;
   wherein the four stages are defined by the Deaeration stage, Anoxic stage, Anaerobic stage and Aerobic stage.

3. The method of claim 1 comprising removing dissolved oxygen and other gases by applying a continuous vacuum in the Deaeration stage to enhance the physical removal of oxygen and other dissolved gases that interfere with the removal of nutrients from the water/wastewater in subsequent stages.

4. The method of claim 2 provides the removal of dissolved oxygen and other gases by a physical deaeration process to control the conditions of the water/wastewater in the Anoxic and Anaerobic stages without addition or recycle of sludge.

5. The method of claim 4 wherein the Anoxic stage operates in an anoxic condition to reduce a nitrate level of the water/wastewater to no more than about 0.5 mg/L.

6. The method of claim 5 wherein the nitrate level of the water/wastewater is reduced in the Anoxic stage so as to avoid interfering with a biological phosphorus removal process of the Anaerobic stage and Aerobic stage.

7. The method of claim 2 comprising adding a carbon source to said water/wastewater in said Anoxic stage to facilitate nitrate removal by the denitrifying organisms.

8. The method of claim 2 comprising maintaining the denitrifying organisms within the Anoxic stage using a high interfacial area packing.

9. The method of claim 2 comprising venting the free nitrogen from the Anoxic stage.

10. The method of claim 1 wherein the bioreactor comprises a modular bioreactor using a cylindrical cross section for each of the stages to enhance control and mixing of flows relative to a rectangular cross section.

11. The method of claim 10 comprising at least one of expanding, substituting and modifying at least one of the stages by adding a modular cylindrical section while maintaining compact vertical alignment of the bioreactor to provide a small footprint compared to horizontal biological nutrient removal plants.

12. A bioreactor for treating water/wastewater to remove nutrients, the bioreactor comprising four stages configured to treat the water/wastewater through a first process of denitrification followed by a second process of biological phosphorus removal without interference between the first and second processes, the four stages further configured to be in compact vertical alignment whereby water/wastewater is fed into the top of a Deaeration stage and flows sequentially through the four stages, from one stage to the other, only downwardly via gravity.

13. The bioreactor of claim 12 wherein the four stages comprise:
   the Deaeration stage in which dissolved oxygen and other gases in the water/wastewater are removed;
   an Anoxic stage in which nitrates in the water/wastewater are reduced to free nitrogen by denitrifying organisms and the free nitrogen is removed from the water/wastewater;
   an Anaerobic stage in which phosphorous accumulating organisms (PAOs) uptake acetates and convert them to polyhydroxyalkanoates (PHAs) and release orthophosphate into water/wastewater; and
   an Aerobic stage in which the PAOs remove the orthophosphates from the water/wastewater.

14. The bioreactor of claim 13 wherein the bioreactor is configured utilizing a compact vertical configuration of the four stages to reduce a footprint of the bioreactor compared to conventional horizontal biological nutrient, removal plants.

15. The bioreactor of claim 12 wherein the Deaeration stage is configured to apply a continuous vacuum to the water/wastewater to remove dissolved oxygen and other gases that interfere with the removal of nutrients from the water/wastewater in subsequent stages.

16. The bioreactor of claim 15 wherein the Deaeration stage is configured with liquid distributors and surface area enhancing packing to enhance dissolved gas removal.

17. The bioreactor of claim 13 wherein the Anoxic stage is configured to receive a carbon source for adding to said water/wastewater to facilitate nitrate removal by the denitrifying organisms.

18. The bioreactor of claim 13 wherein the Aerobic stage is configured to receive oxygen to add to said water/wastewater to facilitate the removal of said orthophosphates.

19. The bioreactor of claim 13 wherein the Anaerobic stage is configured to receive a recycled retentate comprising PAOs obtained from an effluent of said Aerobic stage.

20. The bioreactor of claim 13 wherein the Anoxic stage is configured with a high interfacial area packing to maintain the denitrifying organisms within the Anoxic stage.

21. The bioreactor of claim 12 wherein the stages are defined by a modular construction using a cylindrical cross section for each of the stages to enhance control and mixing of flows relative to the rectangular cross sections of conventional bioreactors.

22. The bioreactor of claim 21 wherein said modular cylindrical construction facilitates at least one of expanding, substituting and modifying at least one of the stages by adding a modular cylindrical section while maintaining compact vertical alignment of the bioreactor to provide a small footprint compared to horizontal biological nutrient removal plants.

23. The bioreactor of claim 12 configured so that water/wastewater is fed into the top of the Deaeration stage and flows downward sequentially from one stage to the other utilizing gravity thereby to reduce pumping requirements compared to conventional horizontal biological nutrient removal plants.

24. A water/wastewater treatment process comprising:
   providing water/wastewater to a bioreactor to produce a treated effluent, the bioreactor comprising four stages configured to treat the water/wastewater through a first denitrification process followed by a second biological phosphorus removal process, the four stages further configured to be in compact vertical alignment whereby water/wastewater is fed into the top of a Deaeration stage and flows sequentially through the four stages, from one stage to the other, only downwardly via gravity.

25. The process of claim 24 wherein the bioreactor is configured utilizing a compact vertical configuration of the four stages to reduce a footprint of the bioreactor compared to conventional horizontal biological nutrient removal plants.

26. The process of claim 24 wherein the bioreactor is configured to separately treat the water/wastewater through the first and second processes without interference between the first and second processes thereby to increase removal efficiency relative to conventional nutrient removal processes.

27. The process of claim 24 comprising feeding the water/wastewater into the top of the Deaeration stage and flowing downward sequentially from one stage to the other utilizing gravity thereby to reduce pumping requirements compared to conventional horizontal biological nutrient removal plants.

28. The process of claim 24 wherein the four stages comprise, in order:
   the Deaeration stage in which dissolved oxygen and other gases in the water/wastewater are removed;
   an Anoxic stage in which nitrates in the water/wastewater are reduced to free nitrogen by denitrifying organisms and the free nitrogen is removed from the water/wastewater;
   an Anaerobic stage in which phosphorous accumulating organisms (PAOs) uptake acetates and convert them to polyhydroxyalkanoates (PHAs) and release orthophosphate into water/wastewater; and
   an Aerobic stage in which the PAOs remove the orthophosphates from the water/wastewater.

29. The process of claim 24 wherein the Deaeration stage is configured to apply a continuous vacuum to the water/wastewater to remove dissolved oxygen and other gases that interfere with the removal of nutrients from the water/wastewater in subsequent stages.

30. The process of claim 29 comprising adding a carbon source to said water/wastewater in said Anoxic stage to facilitate nitrate removal by the denitrifying organisms.

31. The process of claim 29 comprising venting the free nitrogen from the Anoxic stage.

32. The process of claim 28 comprising adding oxygen to said water/wastewater in said Aerobic stage to facilitate the removal of said orthophosphates.

33. The process of claim 28 comprising filtering the treated effluent of said Aerobic stage to produce a final effluent and a retentate comprising PAOs.

34. The process of claim 33 comprising recycling said retentate into said Anaerobic stage.

* * * * *